United States Patent [19]

Sugihara et al.

[11] Patent Number: 5,180,518
[45] Date of Patent: Jan. 19, 1993

[54] OXYGEN ABSORBENT

[75] Inventors: Yasuo Sugihara, Kashiwa; Toshio Komatsu, Ibaraki; Takashi Kashiba; Hidetoshi Hatakeyama, both of Tokyo; Teruo Takeuchi, Nagareyama, all of Japan

[73] Assignee: Mitsubishi Gas Chemical Co., Inc., Tokyo, Japan

[21] Appl. No.: 510,838

[22] Filed: Apr. 18, 1990

[30] Foreign Application Priority Data

| Apr. 25, 1989 | [JP] | Japan | 1-103346 |
| Apr. 25, 1989 | [JP] | Japan | 1-103347 |
| Apr. 25, 1989 | [JP] | Japan | 1-103348 |
| Jun. 7, 1989 | [JP] | Japan | 1-143014 |
| Jun. 7, 1989 | [JP] | Japan | 1-143015 |
| Jun. 7, 1989 | [JP] | Japan | 1-143016 |

[51] Int. Cl.$^5$ .............................. C09K 15/04
[52] U.S. Cl. .................. 252/188.28; 252/184; 252/397
[58] Field of Search .................... 252/188.28, 397, 184

[56] References Cited

U.S. PATENT DOCUMENTS

| 3,595,681 | 7/1971 | Kaplow et al. | 99/199 |
| 4,102,803 | 7/1978 | Fujishima et al. | 252/188.28 X |
| 4,113,652 | 9/1978 | Yoshikawa et al. | 252/428 X |
| 4,127,503 | 11/1978 | Yoshikawa et al. | 252/429 |
| 4,166,807 | 9/1979 | Komatsu et al. | 252/439 X |
| 4,192,773 | 3/1980 | Yoshikawa et al. | 252/188.28 |
| 4,199,472 | 4/1980 | Ohtsuka et al. | 252/427 X |
| 4,366,179 | 12/1982 | Nawata et al. | 426/395 X |
| 4,524,015 | 6/1985 | Takahashi et al. | 252/188 |
| 4,579,223 | 4/1986 | Otsuka et al. | 206/204 |
| 4,667,814 | 5/1987 | Watamatsu et al. | 206/0.7 |
| 4,856,650 | 8/1989 | Inoue | 206/204 |
| 4,908,151 | 3/1990 | Inoue et al. | 252/188 |

FOREIGN PATENT DOCUMENTS

| 52-81085 | 7/1977 | Japan . |
| 55-54034 | 4/1980 | Japan . |
| 56-111042 | 9/1981 | Japan . |
| 56-121634 | 9/1981 | Japan . |

Primary Examiner—Richard D. Lovering
Assistant Examiner—Joseph D. Anthony
Attorney, Agent, or Firm—Leydig, Voit & Mayer

[57] ABSTRACT

The present invention relates to novel oxygen absorbent comprising as main ingredients a 1,2-glycol, glycerine or sugar alcohol with the oxygen absorbent materials.

42 Claims, No Drawings

OXYGEN ABSORBENT

BACKGROUND OF THE INVENTION

The present invention relates to oxygen absorbents. More particularly, the present invention relates to novel oxygen absorbents comprising as a main ingredient a 1,2-glycol, glycerine or sugar alcohol.

The term "oxygen absorbent" as used throughout the specification refers primarily to "composition having an oxygen absorbing action" (oxygen absorbent composition) but is sometimes used to mean "package of a composition having an oxygen absorbing action".

As a technique for preservation of foodstuffs or the like, oxygen absorbents are used. This technique is used to prevent oxidation of foodstuffs or the like and growth, proliferation, etc. of bacteria or mildew by allowing foodstuffs or the like and oxygen absorbents to be present in a sealed bag or sealed container having a gas barrier property (hereafter sometimes simply referred to as a "sealed container" or a "container") thereby to render the sealed system substantially an oxygen-free state. The technique has been widely used for preservation of foodstuffs, etc.

Oxygen absorbents mainly composed of iron powders have been hitherto used because of their ability of absorbing oxygen, easy handling, safety, costs, etc.

In the case of, for example, packaged food, the package is applied to a metal detector after sealing food in a packaging bag to examine if it is contaminated with foreign matter.

However, oxygen absorbents mainly composed of iron powders are detected with the metal detector, as a matter of course. It was thus impossible to apply a metal detector to packaged food sealed together with such oxygen absorbents.

In view of the problem involved in the prior art, an object of the present invention is to provide oxygen absorbents which are not detected with a metal detector.

SUMMARY OF THE INVENTION

The problem described above has been solved by the following compositions:

(1) a composition comprising ① a 1,2-glycol, ② an alkaline substance and ③ a transition metal compound (hereafter often referred to as "first aspect of the invention");

(2) a composition comprising ① a 1,2-glycol, ② an alkaline substance and ④ a phenolic compound or quinone compound (hereafter often referred to as "second aspect of the invention");

(3) a composition comprising ⑤ glycerine and ② an alkaline substance (hereafter often referred to as "third aspect of the invention"); and, (4) a composition comprising ⑥ sugar alcohol and ② an alkaline substance (hereafter often referred to as "fourth aspect of the invention").

The first aspect of the invention covers the embodiments of: the aforesaid composition comprising ① a 1,2-glycol, ② an alkaline substance and ③ a transition metal compound; a composition comprising ①, ② and ③; and compositions obtained by further adding other components to the above compositions, depending upon necessity. Thus, the first aspect the present invention includes (1) an oxygen absorbent comprising a 1,2-glycol, an alkaline substance and a transition metal compound; (2) an oxygen absorbent comprising a 1,2-glycol, an alkaline substance, a transition metal compound and water; (3) an oxygen absorbent comprising a 1,2-glycol, an alkaline substance, a transition metal compound and a solid which is sparingly soluble in water; (4) an oxygen absorbent comprising a 1,2-glycol, an alkaline substance, a transition metal compound, a solid which is sparingly soluble in water, and water; etc.

The second aspect of the invention covers the embodiments of: the aforesaid composition comprising ① a 1,2-glycol, ② an alkaline substance and ④ a phenolic compound or quinone compound and compositions obtained by further adding other components to the above composition, depending upon necessity. Thus, the second aspect the present invention includes (1) an oxygen absorbent comprising a 1,2-glycol, an alkaline substance and a phenolic compound or quinone compound; (2) an oxygen absorbent comprising a 1,2-glycol, an alkaline substance, a phenolic compound or quinone compound and water; (3) an oxygen absorbent comprising a 1,2-glycol, an alkaline substance, a phenolic compound or quinone compound and a transition metal compound; (4) an oxygen absorbent comprising a 1,2-glycol, an alkaline substance, a phenolic compound or quinone compound, a transition metal compound and water; (5) an oxygen absorbent comprising a 1,2-glycol, an alkaline substance, a phenolic compound or quinone compound, and a solid which is sparingly soluble in water; (6) an oxygen absorbent comprising a 1,2-glycol, an alkaline substance, a phenolic compound or quinone compound, a solid which is sparingly soluble in water and water; (7) an oxygen absorbent comprising a 1,2-glycol, an alkaline substance, a phenolic compound or quinone compound, a transition metal compound and a solid which is sparingly soluble in water; (8) an oxygen absorbent comprising a 1,2-glycol, an alkaline substance, a phenolic compound or quinone compound, a transition metal compound, a solid which is sparingly soluble in water and water; etc.

The third aspect of the invention covers the embodiments of: the aforesaid composition comprising ⑤ glycerine and ② an alkaline substance and compositions obtained by further adding other components to the above composition, depending upon necessity. Thus, the third aspect the present invention includes (1) an oxygen absorbent comprising glycerine and an alkaline substance; (2) an oxygen absorbent comprising glycerine, an alkaline substance and water; (3) an oxygen absorbent comprising glycerine, an alkaline substance and a transition metal compound; (4) an oxygen absorbent comprising glycerine, an alkaline substance, a transition metal compound and water; (5) an oxygen absorbent comprising glycerine, an alkaline substance, and a solid which is sparingly soluble in water; (6) an oxygen absorbent comprising glycerine, an alkaline substance, a solid which is sparingly soluble in water and water; (7) an oxygen absorbent comprising glycerine, an alkaline substance, a transition metal compound and a solid which is sparingly soluble in water; (8) an oxygen absorbent comprising glycerine, an alkaline substance, a transition metal compound, a solid which is sparingly soluble in water and water; (9) oxygen absorbents obtained by further adding a phenolic compound or quinone compound to the oxygen absorbents (1) through (8) described above; etc.

The fourth aspect of the invention covers the embodiments of: the aforesaid composition comprising ⑥ sugar alcohol and ② an alkaline substance and compositions obtained by further adding other components to the above composition, depending upon necessity. Thus, the fourth aspect the present invention includes (1) an oxygen absorbent comprising sugar alcohol and an alkaline substance; (2) an oxygen absorbent comprising sugar alcohol, an alkaline substance and water; (3) an oxygen absorbent comprising sugar alcohol, an alkaline substance and a transition metal compound; (4) an oxygen absorbent comprising sugar alcohol, an alkaline substance, a transition metal compound and water; (5) an oxygen absorbent comprising sugar alcohol, an alkaline substance and a solid which is sparingly soluble in water; (6) an oxygen absorbent comprising sugar alcohol, an alkaline substance, a solid which is sparingly soluble in water and water; (7) an oxygen absorbent comprising sugar alcohol, an alkaline substance, a transition metal compound and a solid which is sparingly soluble in water; (8) an oxygen absorbent comprising sugar alcohol, an alkaline substance, a transition metal compound, a solid which is sparingly soluble in water and water; (9) oxygen absorbents obtained by further adding a phenolic compound or quinone compound to the oxygen absorbents (1) through (8) described above; etc.

DETAILED DESCRIPTION OF THE INVENTION

In the embodiments described above, the 1,2-glycol may be one commercially available, may contain impurities such as water or may be a mixture. As the 1,2-glycol, for example, ethylene glycol, propylene glycol, etc. are preferred. Of these, propylene glycol is particularly preferred.

Glycerine may be one commercially available or may contain impurities such as water.

Sugar alcohol may be one commercially available, may contain impurities such as water or may be a mixture. As the sugar alcohol, there may be exemplified sugar alcohol having 4 carbon atoms, sugar alcohol having 5 carbon atoms or sugar alcohol having 6 carbon atoms. Specific examples include sugar alcohol having 4 carbon atoms, e.g., erythritol, etc.; sugar alcohol having 5 carbon atoms such as arabitol, xylitol, adonitol, etc.; and sugar alcohol having 6 carbon atoms such as mannitol, sorbitol, dulcitol, etc. xylitol, mannitol, sorbitol, etc. are preferred, with particular preference being sorbitol.

The alkaline substance is a substance which reacts with water or dissolves in water to become alkaline. Hydroxides, carbonates, hydrogencarbonates, tertiary phosphates, secondary phosphates, etc. of alkali metals or alkaline earth metals are preferred. Of these, hydroxides of alkali metals and alkaline earth metals are particularly preferred. Specific examples which are preferred include sodium hydroxide, sodium carbonate, sodium hydrogencarbonate, sodium tertiary phosphate, sodium secondary phosphate, potassium hydroxide, potassium carbonate, potassium hydrogencarbonate, potassium tertiary phosphate, potassium secondary phosphate, calcium hydroxide, magnesium hydroxide, etc. Of these, sodium hydroxide, potassium hydroxide and calcium hydroxide are particularly preferred. The alkaline substance may be used singly or as admixture of two or more.

An amount of the alkaline substance to be mixed with the 1,2-glycol, glycerine or sugar alcohol is preferably at least 10 parts (by weight, hereafter the same), more preferably 30 to 1,000 parts, based on 100 parts of the 1,2-glycol, glycerine or sugar alcohol. Where the amount of the 1,2-glycol mixed is less than the lower limit described above, an amount of oxygen absorption in the composition decreases undesirably. Conversely where the amount of the 1,2-glycol mixed exceeds the upper limit described above, an amount of oxygen absorption per unit weight decreases so that it is necessary to increase the size of the material for packaging the composition. This necessity results in inconvenience of food packaging in wrapping and also in an undesirable appearance.

In the present invention from the first to fourth aspects, the transition metal compound is exemplified by halides, sulfates, nitrates, phosphates, carbonates, oxides, hydroxides, organic acid salts, other complexes, chelate compounds, etc. of transition metals. As transition metals in the transition metal compound, iron, cobalt, nickel, copper, zinc, manganese, etc. are used. Of these, copper, iron, manganese, etc. are preferred. Taking safety into account, iron is most preferred. Specific examples of the most preferred transition metal compound in the present invention from the first to third aspects include inorganic or organic iron compounds such as ferrous chloride, ferric chloride, ferrous sulfate, ferric sulfate, ferrous hydroxide, ferric hydroxide, iron citrate, ferrous tartarate, ferric tartarate, etc. In the present invention from the fourth aspect, ferrous chloride, ferric chloride, ferrous sulfate, ferric sulfate, cuprous chloride, cupric chloride, cupric sulfate, cupric hydroxide, copper citrate, cuprous tartarate, cupric tartarate, manganese chloride, etc. are most preferred.

These transition metal compounds are incorporated singly or as admixture of two or more, depending upon necessity. The transition metal compound acts as a catalyst of the composition of the present invention. An amount of the transition metal compound to be formulated is preferably 1 part or more particularly preferably 5 parts or more, based on 100 parts of the 1,2-glycol, glycerine or sugar alcohol.

The phenolic compound exhibits a catalytic action in the present invention. Even though the phenolic compound is added in a small quantity, the rate of oxygen absorption can be increased. As the phenolic compound, a monovalent phenolic compound and a polyvalent phenolic compound of at least bivalency are used. Any substituted phenols and aromatic derivatives having other substituents on the aromatic nucleus may be used as the monovalent phenolic compound so long as they contain one hydroxy group directly bound to the aromatic nucleus in one molecule. Any substituted phenols and aromatic derivatives having other substituents on the aromatic nucleus may be used as the divalent phenolic compound so long as they contain at least two hydroxy groups directly bound to the aromatic nucleus in one molecule. In the present invention, phenolic compounds having a plurality of aromatic nuclei in one molecule and containing a plurality of hydroxy groups directly bound to the aromatic nuclei are classified as polyvalent phenolic compounds, even though they have a single hydroxy group on a single aromatic nucleus. Of course, the phenolic compound may be a phenol salt (phenolate) in which hydrogen of the hydroxy group is substituted with a metal or the like. Of these phenolic compounds, a polyvalent phenolic compound showing a valency of two or more is preferred because of their catalytic action. Specific examples of the polyvalent phenolic compound include catechol, resorcine, hydroquinone, pyrogallol, naphthohydroquinone, phloroglucine, gallic acid, tannin, tannic acid, dihydroxyphenylphenol, or derivatives thereof. Of these, polyvalent phenolic compounds such as catechol, resorcine, hydroquinone, pyrogallol, gallic acid, tannin, tannic acid, etc. are preferred in view of their catalytic action on oxygen absorption rate, easy access, etc.

In the present invention, quinone compounds may also be used instead of the phenolic compounds. The quinone compounds also show a catalytic action resulting in an increased oxygen absorption rate by their addition even in a small quantity. As the quinone compounds, any o-quinones and p-quinones may be used. The quinone compounds may be their derivatives having a substituent(s) on the quinone nucleus as long as they have a quinone structure. Specific examples include benzoquinone, naphthoquinone, phenanthraquinone, diphenoquinone, etc. or derivatives thereof. Of these, benzoquinone and diphenoquinone are preferred.

The phenolic compound and the quinone compound are used singly or as admixture of two or more, depending upon necessity. An amount of the phenolic compound or quinone compound formulated in the 1,2-glycol, glycerine or sugar alcohol is not particularly limited but is preferably at least one part, more preferably 5 parts or more, based on 100 parts of the 1,2-glycol, glycerine or sugar alcohol. When the amount is less than the lower limit described above, the catalytic effect of the phenolic compound or quinone compound is poor. The upper limit of an amount of the phenolic compound or quinone compound formulated with the 1,2-glycol, glycerine or sugar alcohol is not particularly limited. It is possible to formulate a catalytic amount or more of the phenolic compound or quinone compound but it is preferred to formulate less than 5,000 parts, particularly Preferably less than 1,000 parts of the phenolic compound or quinone compound, based on 100 parts of the 1,2 glycol, glycerine or sugar alcohol. Even though the amount of the phenolic compound or quinone compound to be formulated exceeds the upper limit described above, it does not contribute to an increase in the oxygen absorption amount of the 1,2-glycol, glycerine or sugar alcohol proportional to an increase in compositional amount. Thus, economical efficiency is poor.

The solid which is sparingly soluble in water is a solid substance which is insoluble or difficultly soluble in water. Specific examples include powders or particles of activated charcoal, zeolite, perlite, diatomaceous earth, active clay, silica, kaolin, talc, bentonite, activated alumina, gypsum, silica alumina, calcium silicate, magnesium oxide, black lead, carbon black, aluminum hydroxide, iron oxide, etc. The solid which is sparingly soluble in water may be used singly or as admixture of two or more, depending upon necessity. By formulating the solid which is sparingly soluble in water, the oxygen absorption rate or the oxygen absorption amount can be increased and handling of the composition can be simplified. Furthermore, by inclusion in the formulation of the solid which is sparingly soluble in water can increase the contact area of the liquid components in the composition with oxygen. An amount of the solid which is sparingly soluble in water may be appropriately chosen in relation to the other components but is not particularly limited. It is preferred to formulate the solid substance preferably in an amount of 0.1 to 10,000 parts, more preferably in an amount of 1 to 1,000 parts, based on 100 parts of the 1,2-glycol, glycerine or sugar alcohol.

Where no water is added in the present invention, water required for the reaction is supplied from water evaporated from preserved matters such as food, etc. Where water is added to the oxygen absorbent composition, the oxygen absorbing reaction proceeds without relying on water from food, etc. so that it is possible to regulate progress of the oxygen absorbing reaction by the amount of water added. In this case, the amount of water to be added is not particularly limited but is desirably controlled to less than 70 wt %, more desirably less than 50 wt %, based on the total weight of the composition. When the amount of water added exceeds the above range, the resulting composition becomes paste so that the contact area of the composition with oxygen becomes undesirably small.

In the present invention, the method for mixing the respective components described above is not particularly limited. In the case that the components are liquid and powders, any method is applicable so long as these components can be uniformly mixed with each other. In the case of using particulate components, for example, a method in which liquid is impregnated with particles and powders are then sprinkled over the impregnated particles may be adopted. The respective components described above are generally encased in an air-permeable packaging material to form a package. A method of packaging comprises, for example, mixing the respective components, and wrapping the mixture with a small bag sealed by heat-sealing the periphery of an air-permeable packaging material thereby to form an oxygen absorbent package.

The oxygen absorbent package can be used to preserve foodstuffs or the like, by encasing the oxygen absorbent together with food, etc. in an air-impermeable packaging material and sealing the same, or encasing the oxygen absorbent together with food, etc. in a sealed container and sealing the container, etc.

Where no water is contained in the composition, the oxygen absorbent composition of the present invention can be applied to foodstuffs having a relatively large water content in which moisture evaporated from the foodstuffs is taken up into the composition to absorb oxygen. In particular, the 1,2-glycols such as ethylene glycol, propylene glycol, etc. or glycerine are extremely strongly hydroscopic or the sugar alcohol is hygroscopic so that the composition of the present invention displays a good oxygen absorbing function in an atmosphere with rapid evaporation of moisture. In this case, there is an advantage that handling is easy in sealing the oxygen absorbent together with foodstuffs. Furthermore, when water is incorporated in the composition, the oxygen absorbent can be used as an oxygen absorbent which can absorb oxygen, irrespective of water content of food.

DESCRIPTION OF THE PREFERRED EMBODIMENTS

Examples 1 through 4

After the respective components for oxygen absorbents shown in Table 1 were mixed with each other, the oxygen absorbents were encased in a small bag (50 mm in length, 80 mm in width) prepared using a packaging material of paper laminated with perforated polyethylene, respectively, to prepare oxygen absorbent packages. The oxygen absorbent packages were put in a bag laminated with polyvinylidene chloride-coated stretched nylon and polyethylene, respectively, together with 500 ml of air. After sealing, the bag was allowed to stand in an atmosphere of 25° C. Six days after, the oxygen concentration in the bag was measured to determine the oxygen absorption amount. The results are shown in Table 1.

In Examples 1 and 3, water-impregnated absorbent wadding was sealed in the bag together with the oxygen absorbent and relative humidity was set at 100%.

TABLE 1

|  | Example 1 | Example 2 | Example 3 | Example 4 |
|---|---|---|---|---|
| Amount formulated (unit, g): | | | | |
| Propylene glycol | 1 | 1 | 1 | 1 |
| Calcium hydroxide | 4.5 | 4.5 | 1 | 1 |
| Water | | 0.6 | | |
| Ferrous chloride | 0.2 | 0.2 | 0.2 | 0.2 |
| Activated charcoal | | | 1 | 1 |
| Amount of oxygen absorbed (ml) | 19 | 20 | 58 | 83 |

Example 5

The procedure was repeated in a manner similar to Example 1 except that 5 g of propylene glycol, 5 g of calcium hydroxide, 1 g of manganese chloride, 5 g of activated charcoal and 5 g of water were mixed and the mixture was used as an oxygen absorbent.

The oxygen concentration in the bag measured 2 days after showed 0.1% or less. The amount of oxygen absorbed was 103 ml in this case.

Example 6

The procedure was repeated in a manner similar to Example 1 except that 5 g of ethylene glycol, 5 g of calcium hydroxide, 1 g of ferrous chloride, 5 g of activated charcoal and 5 g of water were mixed and the mixture was used as an oxygen absorbent.

The oxygen concentration in the bag measured 2 days after showed 0.1% or less. An amount of oxygen absorbed was 103 ml in this case.

Example 7

After 400 rice weevil imagines were fed in 1 kg of brown rice for a week, the imagines were removed. The remaining brown rice was divided into 20 g each and provided as samples for the following test.

After 20 g of brown rice sample and the oxygen absorbent package of Example 5 were put in a bag laminated with polyvinylidene chloride-coated stretched nylon and polyethylene, the bag was sealed to have an air amount in the bag of 500 ml. Ten specimens were prepared in a similar manner and stored with a thermostat set at 20° C. After storing for 20 days, the bags were unsealed and allowed to stand at 25° C. with the thermostat. The number of rice weevils which emerged from the brown rice sample was recorded.

For a control group, the same test was performed as described above except that the oxygen absorbent package was not enclosed in the bag. In this case, the number of rice weevils which emerged was 100%.

The results are shown in Table 2.

TABLE 2

|  | Number of Rice Weevils Emerging | Rate of Weevil Emergence |
|---|---|---|
| Example 7 | 0 | 0% |
| Control group | 1,500 | 100% |

Example 8

After 5 bean jam-filled buns weighing 15 g each and the oxygen absorbent package of Example 6 were put in a bag laminated with polyvinylidene chloride-coated stretched nylon and polyethylene, the bag was sealed to have an air amount in the bag of 500 ml and stored at 20° C. One week after, the oxygen concentration in the bag and the concentration of carbon dioxide gas were measured and the property of the buns was observed.

For a control group, the same test was performed as described above except that the oxygen absorbent package was not enclosed in the bag.

The results are shown in Table 3.

TABLE 3

|  | Concentration of Oxygen (%) | Concentration of Carbon Dioxide (%) | Property of Bean Jam-Filled Buns |
|---|---|---|---|
| Example 8 | 0.01 | 0 | No-abnormality was noted. |
| Control group | 16.4 | 3.6 | Mildew generated. |

Examples 9 through 17

After the respective components for oxygen absorbents shown in Table 4 were mixed with each other, the oxygen absorbents were encased in a small bag (50 mm in length, 80 mm in width) prepared using a packaging material of paper laminated with perforated polyethylene, respectively, to prepare oxygen absorbent packages. The oxygen absorbent packages were put in a bag laminated with polyvinylidene chloride-coated stretched nylon and polyethylene, respectively, together with 1,000 ml of air. After sealing, the bag was allowed to stand in an atmosphere of 25° C. Three days after, the oxygen concentration in the bag was measured to determine the oxygen absorption amount. The results are shown in Table 4.

In Examples 9, 11, 13, 15 and 17, water-impregnated absorbent wadding was sealed in the bag together with the oxygen absorbent materials and relative humidity was set at 100%.

TABLE 4

|  | Example 9 | Example 10 | Example 11 | Example 12 | Example 13 | Example 14 | Example 15 | Example 16 | Example 17 |
|---|---|---|---|---|---|---|---|---|---|
| Amount formulated (unit, g): | | | | | | | | | |
| Propylene glycol | 0.5 | 0.5 | 0.5 | 0.5 | 0.5 | 0.5 | 0.5 | 0.5 | 0.5 |
| Calcium hydroxide | 3 | 3 | 0.5 | 0.5 | 3 | 3 | 0.5 | 0.5 | 3 |
| Catechol | 0.1 | 0.1 | 0.1 | 0.1 | 0.1 | 0.1 | 0.1 | 0.1 | |
| p-Benzoquinone | | | | | | | | | 0.1 |
| Water | | 0.3 | | 0.3 | | 0.3 | | 0.3 | |
| Ferrous chloride | | | | | 0.1 | 0.1 | 0.1 | 0.1 | |
| Silica powders | | | 0.4 | 0.4 | | | 0.4 | 0.4 | |

TABLE 4-continued

| | Example 9 | Example 10 | Example 11 | Example 12 | Example 13 | Example 14 | Example 15 | Example 16 | Example 17 |
|---|---|---|---|---|---|---|---|---|---|
| Amount of oxygen absorbed (ml) | 67 | 68 | 61 | 71 | 71 | 75 | 78 | 84 | 27 |

Comparative Example 1

The procedure was repeated in a manner similar to Example 9 except that catechol was not used as an oxygen absorbent. The amount of oxygen absorbed was 1 ml in this case.

Example 18

The procedure was repeated in a manner similar to Example 9 except that 5 g of propylene glycol, 5 g of calcium hydroxide, 1 g of hydroquinone, 1 g of ferrous chloride, 3 g of silica powders, 1 g of activated charcoal and 3 g of water were mixed and the mixture was used as an oxygen absorbent.

The oxygen concentration in the bag measured 2 days after showed 0.1% or less. The amount of oxygen absorbed was 206 ml in this case.

Example 19

The procedure was repeated in a manner similar to Example 9 except that 5 g of ethylene glycol, 5 g of calcium hydroxide, 1 g of catechol, 1 g of ferrous chloride, 5 g of activated charcoal and 5 g of water were mixed and the mixture was used as an oxygen absorbent.

The oxygen concentration in the bag measured 2 days after showed 0.1% or less. The amount of oxygen absorbed was 206 ml in this case.

Example 20

After 400 rice weevil imagines were fed in 1 kg of brown rice for a week, the imagines were removed. The remaining brown rice was divided into 40 g each and provided as samples for the following test.

After 40 g of brown rice sample and the oxygen absorbent package of Example 13 were put in a bag laminated with polyvinylidene chloride-coated stretched nylon and polyethylene, the bag was sealed to have an air amount in the bag of 1000 ml. Ten specimens were prepared in a similar manner and stored with a thermostat set at 20° C. After storing for 20 days, the bags were unsealed and allowed to stand at 25° C. with the thermostat. The number of rice weevils which emerged from the brown rice sample was recorded.

For a control group, the same test was performed as described above except that the oxygen absorbent package was not enclosed in the bag. In this case, the number of rice weevils which emerged was 100%.

The results are shown in Table 5.

TABLE 5

| | Number of Rice Weevils Emerging | Rate of Weevil Emergence |
|---|---|---|
| Example 20 | 0 | 0% |
| Control group | 1,500 | 100% |

Example 21

After 10 bean jam-filled buns weighing 15 g each and the oxygen absorbent package of Example 18 were put in a bag laminated with polyvinylidene chloride-coated stretched nylon and polyethylene, the bag was sealed to have an air amount in the bag of 1000 ml and stored at 20° C. One week after, the oxygen concentration in the bag and the concentration of carbon dioxide gas were measured and the property of the buns was observed.

For a control group, the same test was performed as described above except that the oxygen absorbent package was not enclosed in the bag.

The results are shown in Table 6.

TABLE 6

| | Concentration of Oxygen (%) | Concentration of Carbon Dioxide (%) | Property of Bean Jam-Filled Buns |
|---|---|---|---|
| Example 21 | 0.01 | 0 | No-abnormality was noted. |
| Control group | 16.4 | 3.6 | Mildew generated. |

Examples 22 through 29

After the respective components for oxygen absorbents shown in Table 7 were mixed with each other, the oxygen absorbents were encased in a small bag (50 mm in length, 80 mm in width) prepared using a packaging material of paper laminated with perforated polyethylene, respectively, to prepare oxygen absorbent packages. The oxygen absorbent packages were put in a bag laminated with polyvinylidene chloride-coated stretched nylon and polyethylene, respectively, together with 1,000 ml of air. After sealing, the bag was allowed to stand in an atmosphere of 25° C. Six days after, the oxygen concentration in the bag was measured to determine the oxygen absorption amount. The results are shown in Table 7.

In Examples 22, 24, 26 and 28, water-impregnated absorbent wadding was sealed in the bag together with the oxygen absorbent and relative humidity was set at 100%.

TABLE 7

| | Example 22 | Example 23 | Example 24 | Example 25 | Example 26 | Example 27 | Example 28 | Example 29 |
|---|---|---|---|---|---|---|---|---|
| Amount formulated (unit, g): | | | | | | | | |
| Glycerine | 1 | 1 | 1 | 1 | 1 | 1 | 1 | 1 |
| Calcium hydroxide | 4.5 | 4.5 | 4.5 | 4.5 | 3 | 3 | 3 | 3 |
| Water | | 0.6 | | 0.6 | | 0.6 | | 0.6 |
| Ferrous chloride | | | 0.2 | 0.2 | | | 0.2 | 0.2 |
| Silica powders | | | | | 0.3 | 0.3 | 0.3 | 0.3 |
| Amount of oxygen | 11 | 13 | 43 | 54 | 18 | 21 | 92 | 124 |

TABLE 7-continued

|  | Example 22 | Example 23 | Example 24 | Example 25 | Example 26 | Example 27 | Example 28 | Example 29 |
|---|---|---|---|---|---|---|---|---|
| absorbed (ml) | | | | | | | | |

Example 30

The procedure was repeated in a manner similar to Example 22 except that 2 g of glycerine, 2 g of calcium hydroxide, 0.4 g of ferrous chloride, 1.2 g of silica powders, 0.4 g of activated charcoal and 1.2 g of water were mixed and the mixture was used as an oxygen absorbent.

The oxygen concentration in the bag measured 2 days after showed 0.1% or less. An amount of oxygen absorbed was 206 ml in this case.

Example 31

The procedure was repeated in a manner similar to Example 22 except that 2 g of glycerine, 3.4 g of calcium hydroxide, 0.6 g of manganese chloride, 2.6 g of silica powders and 2 g of water were mixed and the mixture was used as an oxygen absorbent.

The oxygen concentration in the bag measured 2 days after showed 0.1% or less. The amount of oxygen absorbed was 206 ml in this case.

Example 32

The procedure was repeated in a manner similar to example 22 except that 2 g of glycerine, 3.4 g of calcium hydroxide, 0.6 g of copper sulfate, 2.6 g of silica powders and 3.4 g of water were mixed and the mixture was used as an oxygen absorbent.

The oxygen concentration in the bag measured 2 days after showed 0.1% or less. The amount of oxygen absorbed was 206 ml in this case.

Example 33

After 400 rice weevil imagines were fed in 1 kg of brown rice for a week, the imagines were removed. The remaining brown rice was divided into 40 g each and provided as samples for the following test.

After 40 g of brown rice sample and the oxygen absorbent package of Example 30 were put in a bag laminated with polyvinylidene chloride-coated stretched nylon and polyethylene, the bag was sealed to have an air amount in the bag of 1,000 ml. Ten specimens were prepared in a similar manner and stored with a thermostat set at 20° C. After storing for 20 days, the bags were unsealed and allowed to stand at 25° C. with the thermostat. The number of rice weevils emerged from the brown rice sample was recorded.

For a control group, the same test was performed as described above except that the oxygen absorbent package was not enclosed in the bag. In this case, the number of rice weevils emerged was made 100%.

The results are shown in Table 8.

TABLE 8

|  | Number of Rice Weevils Emerging | Rate of Weevil Emergence |
|---|---|---|
| Example 33 | 0 | 0% |
| Control group | 1,500 | 100% |

Example 34

After 10 bean jam-filled buns weighing 15 g each and the oxygen absorbent package of Example 32 were put in a bag laminated with polyvinylidene chloride-coated stretched nylon and polyethylene, the bag was sealed to have an air amount in the bag of 1,000 ml and stored at 20° C. One week after, the oxygen concentration in the bag and the concentration of carbon dioxide gas were measured and the property of the buns was observed.

For a control group, the same test was performed as described above except that the oxygen absorbent package was not enclosed in the bag.

The results are shown in Table 9.

TABLE 9

|  | Concentration of Oxygen (%) | Concentration of Carbon Dioxide (%) | Property of Bean Jam-Filled Buns |
|---|---|---|---|
| Example 34 | 0.01 | 0 | No-abnormality was noted. |
| Control group | 16.7 | 3.8 | Mildew generated. |

Examples 35 through 43

After the respective components for oxygen absorbents shown in Table 10 were mixed with each other, the oxygen absorbents were encased in a small bag (50 mm in length, 80 mm in width) prepared using a packaging material of paper laminated with perforated polyethylene, respectively, to prepare oxygen absorbent packages. The oxygen absorbent packages were put in a bag laminated with polyvinylidene chloride-coated stretched nylon and polyethylene, respectively, together with 1,000 ml of air. After sealing, the bag was allowed to stand in an atmosphere of 25° C. Three days after, the oxygen concentration in the bag was measured to determine an oxygen absorption amount. The results are shown in Table 10.

In Examples 35, 37, 39, 41 and 43, water-impregnated absorbent wadding was sealed in the bag together with the oxygen absorbent and relative humidity was set at 100%.

TABLE 10

|  | Example 35 | Example 36 | Example 37 | Example 38 | Example 39 | Example 40 | Example 41 | Example 42 | Example 43 |
|---|---|---|---|---|---|---|---|---|---|
| Amount formulated (unit, g): | | | | | | | | | |
| Glycerine | 0.5 | 0.5 | 0.5 | 0.5 | 0.5 | 0.5 | 0.5 | 0.5 | 0.5 |
| Calcium hydroxide | 3 | 3 | 0.5 | 0.5 | 3 | 3 | 0.5 | 0.5 | 3 |
| Catechol | 0.1 | 0.1 | 0.1 | 0.1 | 0.1 | 0.1 | 0.1 | 0.1 | |
| p-Benzoquinone | | | | | | | | | 0.1 |
| Water | | 0.3 | | 0.3 | | 0.3 | | 0.3 | |

TABLE 10-continued

|  | Example 35 | Example 36 | Example 37 | Example 38 | Example 39 | Example 40 | Example 41 | Example 42 | Example 43 |
| --- | --- | --- | --- | --- | --- | --- | --- | --- | --- |
| Ferrous chloride |  |  |  |  | 0.1 | 0.1 | 0.1 | 0.1 |  |
| Silica powders |  |  | 0.4 | 0.4 |  |  | 0.4 | 0.4 |  |
| Amount of oxygen absorbed (ml) | 95 | 98 | 99 | 104 | 108 | 112 | 119 | 126 | 73 |

Comparative Example 2

The procedure was repeated in a manner similar to Example 35 except that catechol was not used as an oxygen absorbent. The amount of oxygen absorbed was 5 ml in this case.

Example 44

The procedure was repeated in a manner similar to Example 35 except that 2 g of glycerine, 2 g of calcium hydroxide, 0.4 g of ferrous chloride, 1.2 g of silica powders, 0.4 g of activated charcoal and 1.2 g of water were mixed and the mixture was used as an oxygen absorbent.

The oxygen concentration in the bag measured 2 days after showed 0.1% or less. An amount of oxygen absorbed was 206 ml in this case.

Example 45

The procedure was repeated in a manner similar to Example 35 except that 2 g of glycerine, 2 g of calcium hydroxide, 0.4 g of tannic acid (tannic acid CL, manufactured by Fuji Chemical Industry Co., Ltd.), 0.4 g of ferrous chloride, 1.6 g of silica powders and 1.2 g of water were mixed and the mixture was used as an oxygen absorbent.

The oxygen concentration in the bag measured 2 days after showed 0.1% or less. The amount of oxygen absorbed was 206 ml in this case.

Example 46

The procedure was repeated in a manner similar to Example 35 except that 2 g of glycerine, 3.4 g of calcium hydroxide, 0.4 g of 2,6-di-t-butyl-p-cresol, 0.4 g of copper sulfate, 2.6 g of silica powders and 3.4 g of water were mixed and the mixture was used as an oxygen absorbent.

The oxygen concentration in the bag measured 2 days after showed 0.1% or less. The amount of oxygen absorbed was 206 ml in this case.

Example 47

After 400 rice weevil imagines were fed in 1 kg of brown rice for a week, the imagines were removed. The remaining brown rice was divided into 40 g each and provided as samples for the following test.

After 40 g of brown rice sample and the oxygen absorbent package of Example 44 were put in a bag laminated with polyvinylidene chloride coated stretched nylon and polyethylene, the bag was sealed to have an air amount in the bag of 1,000 ml. Ten specimens were prepared in a similar manner and stored with a thermostat set at 20° C. After storing for 20 days, the bags were unsealed and allowed to stand at 25° C. with the thermostat. The number of rice weevils that emerged from the brown rice sample was recorded.

For control group, the same test was performed as described above except that the oxygen absorbent package was not enclosed in the bag. In this case, the number of rice weevils which emerged was 100%. The results are shown in Table 11.

TABLE 11

|  | Number of Rice Weevils Emerging | Rate of Weevil Emergence |
| --- | --- | --- |
| Example 47 | 0 | 0% |
| Control group | 1,500 | 100% |

Example 48

After 10 bean jam-filled buns weighing 15 g each and the oxygen absorbent package of Example 45 were put in a bag laminated with polyvinylidene chloride-coated stretched nylon and polyethylene, the bag was sealed to have an air amount in the bag of 1,000 ml and stored at 20° C. One week after, the oxygen concentration in the bag and the concentration of carbon dioxide gas were measured and the property of the buns was observed.

For a control group, the same test was performed as described above except that the oxygen absorbent package was not enclosed in the bag.

The results are shown in Table 12.

TABLE 12

|  | Concentration of Oxygen (%) | Concentration of Carbon Dioxide (%) | Property of Bean Jam-Filled Buns |
| --- | --- | --- | --- |
| Example 48 | 0.01 | 0 | No-abnormality was noted. |
| Control group | 16.5 | 4.1 | Mildew generated. |

Examples 49 through 58

After the respective components for oxygen absorbents shown in Table 13 were mixed with each other, the oxygen absorbents were encased in a small bag (50 mm in length, 80 mm in width) prepared using a packaging material of paper laminated with perforated polyethylene, respectively, to prepare oxygen absorbent packages. The oxygen absorbent packages were put in a bag laminated with polyvinylidene chloride-coated stretched nylon and polyethylene, respectively, together with 1,000 ml of air. After sealing, the bag was allowed to stand in an atmosphere of 25° C. Six days after, the oxygen concentration in the bag was measured to determine the oxygen absorption amount. The results are shown in Table 13.

In Examples 49, 51, 53 and 55, water-impregnated absorbent wadding was sealed in the bag together with the oxygen absorbent and relative humidity was set at 100%.

TABLE 13

|  | Example 49 | Example 50 | Example 51 | Example 52 | Example 53 | Example 54 | Example 55 | Example 56 | Example 57 | Example 58 |
|---|---|---|---|---|---|---|---|---|---|---|
| Amount formulated (unit, g): | | | | | | | | | | |
| Erythritol | 1 | 1 | 1 | 1 | 1 | 1 | 1 | 1 | 1 | 1 |
| Calcium hydroxide | 3.5 | 3.5 | 3.5 | 3.5 | 3 | 3 | 3 | 3 | 3 | 3 |
| Water | | 0.6 | | 0.6 | | 0.6 | | 0.6 | 0.6 | 0.6 |
| Ferrous chloride | | | 0.2 | 0.2 | | | 0.2 | 0.2 | | |
| Manganese chloride | | | | | | | | | 0.2 | |
| Cuprous chloride | | | | | | | | | | 0.2 |
| Silica powders | | | | | 0.3 | 0.3 | 0.3 | 0.3 | 0.2 | |
| Amount of oxygen absorbed (ml) | 7 | 11 | 28 | 31 | 11 | 14 | 42 | 48 | 134 | 172 |

Example 59

The procedure was repeated in a manner similar to Example 49 except that 2 g of erythritol, 3.3 g of calcium hydroxide, 0.7 g of copper sulfate, 2 g of silica powders, 0.7 g of activated charcoal and 2 g of water were mixed and the mixture was used as an oxygen absorbent.

The oxygen concentration in the bag measured 2 days after showed 0.1% or less. The amount of oxygen absorbed was 206 ml in this case.

Example 60

The procedure was repeated in a manner similar to Example 49 except that 2 g of xylitol, 3.3 g of calcium hydroxide, 0.7 g of copper sulfate, 2 g of silica powders, 0.7 g of activated charcoal and 2 g of water were mixed and the mixture was used as an oxygen absorbent.

The oxygen concentration in the bag measured 2 days after showed 0.1% or less. The amount of oxygen absorbed was 206 ml in this case.

Example 61

The procedure was repeated in a manner similar to Example 49 except that 2 g of sorbitol 3.3 g of calcium hydroxide, 0.7 g of copper sulfate, 2 g of silica powders, 0.7 g of activated charcoal and 2 g of water were mixed and the mixture was used as an oxygen absorbent.

The oxygen concentration in the bag measured 2 days after showed 0.1% or less. The amount of oxygen absorbed was 206 ml in this case.

Example 62

The procedure was repeated in a manner similar to Example 49 except that 2 g of sorbitol, 3.3 g of potassium hydroxide, 0.7 g of copper sulfate, 4.7 g of activated charcoal and 3.3 g of water were mixed and the mixture was used as an oxygen absorbent.

The oxygen concentration in the bag measured 2 days after showed 0.1% or less. The amount of oxygen absorbed was 206 ml in this case.

Example 63

After 400 rice weevil imagines were fed in 1 kg of brown rice for a week, the imagines were removed. The remaining brown rice was divided into 40 g each and provided as samples for the following test.

After 40 g of brown rice sample and the oxygen absorbent package of Example 61 were put in a bag laminated with polyvinylidene chloride-coated stretched nylon and polyethylene, the bag was sealed to have an air amount in the bag of 1,000 ml. Ten specimens were prepared in a similar manner and stored with a thermostat set at 20° C. After storing for 20 days, the bags were unsealed and allowed to stand at 25° C. with the thermostat. The number of rice weevils emerged from the brown rice sample was recorded.

For a control group, the same test was performed as described above except that the oxygen absorbent package was not enclosed in the bag. In this case, the number of rice weevils which emerged was 100%.

The results are shown in Table 14.

TABLE 14

|  | Number of Rice Weevils Emerging | Rate of Weevil Emergence |
|---|---|---|
| Example 63 | 0 | 0% |
| Control group | 1,500 | 100% |

Example 64

After 10 bean jam-filled buns weighing 15 g each and the oxygen absorbent package of Example 62 were put in a bag laminated with polyvinylidene chloride-coated stretched nylon and polyethylene, the bag was sealed to have an air amount in the bag of 1,000 ml and stored at 20° C. One week after, the oxygen concentration in the bag and the concentration of carbon dioxide gas were measured and the property of the buns was observed.

For a control group, the same test was performed as described above except that the oxygen absorbent package was not enclosed in the bag.

The results are shown in Table 15.

TABLE 15

|  | Concentration of Oxygen (%) | Concentration of Carbon Dioxide (%) | Property of Bean Jam-Filled Buns |
|---|---|---|---|
| Example 64 | 0.01 | 0 | No-abnormality was noted. |
| Control group | 16.7 | 3.8 | Mildew generated. |

Examples 65 through 73

After the respective components for oxygen absorbents shown in Table 16 were mixed with each other, the oxygen absorbents were encased in a small bag (50 mm in length, 80 mm in width) prepared using a packaging material of paper laminated with perforated polyethylene, respectively, to prepare oxygen absorbent packages. The oxygen absorbent packages were put in a bag laminated with polyvinylidene chloride-coated stretched nylon and polyethylene, respectively, together with 1,000 ml of air. After sealing, the bag was allowed to stand in an atmosphere of 25° C. Three days after, the oxygen concentration in the bag was measured to determine the oxygen absorption amount. The results are shown in Table 16. In Examples 65, 67, 69, 71 and 73, water-impregnated absorbent wadding was sealed in the bag together with the oxygen absorbent and relative humidity was set at 100%.

nylon and polyethylene, the bag was sealed to have an air amount in the bag of 1,000 ml. Ten specimens were prepared in a similar manner and stored with a thermostat set at 20° C. After storing for 20 days, the bags were unsealed and allowed to stand at 25° C. The number of

TABLE 16

|  | Example 65 | Example 66 | Example 67 | Example 68 | Example 69 | Example 70 | Example 71 | Example 72 | Example 73 |
|---|---|---|---|---|---|---|---|---|---|
| Amount formulated (unit, g): |  |  |  |  |  |  |  |  |  |
| Erythritol | 0.5 | 0.5 | 0.5 | 0.5 | 0.5 | 0.5 | 0.5 | 0.5 | 0.5 |
| Calcium hydroxide | 3 | 3 | 0.5 | 0.5 | 3 | 3 | 0.5 | 0.5 | 3 |
| Catechol | 0.1 | 0.1 | 0.1 | 0.1 | 0.1 | 0.1 | 0.1 | 0.1 |  |
| p-Benzoquinone |  |  |  |  |  |  |  |  | 0.1 |
| Water |  | 0.3 |  | 0.3 |  | 0.3 |  | 0.3 |  |
| Ferrous chloride |  |  |  |  | 0.1 | 0.1 | 0.1 | 0.1 |  |
| Silica powders |  |  | 0.4 | 0.4 |  |  | 0.4 | 0.4 |  |
| Amount of oxygen absorbed (ml) | 36 | 71 | 35 | 59 | 72 | 86 | 50 | 107 | 20 |

Comparative Example 3

The procedure was repeated in a manner similar to Example 65 except that catechol was not used as an oxygen absorbent. The amount of oxygen absorbed was 3 ml in this case.

Example 74

The procedure was repeated in a manner similar to Example 65 except that 2 g of erythritol, 3.3 g of calcium hydroxide, 0.7 g of 2,6-di-t-butyl-p-cresol, 0.7 g of copper sulfate, 2 g of silica powders, 0.7 g of activated charcoal and 2 g of water were mixed and the mixture was used as an oxygen absorbent.

The oxygen concentration in the bag measured 2 days after showed 0.1% or less. The amount of oxygen absorbed was 206 ml in this case.

Example 75

The procedure was repeated in a manner similar to Example 65 except that 2 g of xylitol, 3.3 g of calcium hydroxide, 0.7 g of catechol, 0.7 g of copper sulfate, 2 g of silica powders, 0.7 g of activated charcoal and 2 g of water were mixed and the mixture was used as an oxygen absorbent.

The oxygen concentration in the bag measured 2 days after showed 0.1% or less. The amount of oxygen absorbed was 206 ml in this case.

Example 76

The procedure was repeated in a manner similar to Example 65 except that 2 g of sorbitol, 3.3 g of calcium hydroxide, 0.7 g of tannic acid (tannic acid CL, manufactured by Fuji Chemical Industry Co., Ltd.), 0.7 g of copper sulfate, 2 g of silica powders, 0.7 g of activated charcoal and 2 g of water were mixed and the mixture was used as an oxygen absorbent.

The oxygen concentration in the bag measured 2 days after showed 0.1% or less. The amount of oxygen absorbed was 206 ml in this case.

Example 77

After 400 rice weevil imagines were fed in 1 kg of brown rice for a week, the imagines were removed. The remaining brown rice was divided into 40 g each and provided as samples for the following test.

After 40 g of brown rice sample and the oxygen absorbent package of Example 75 were put in a bag laminated with polyvinylidene chloride-coated stretched rice weevils emerged from the brown rice sample was recorded.

For a control group, the same test was performed as described above except that the oxygen absorbent package was not enclosed in the bag. In this case, the number of rice weevils emerged was made 100%.

The results are shown in Table 17.

TABLE 17

|  | Number of Rice Weevils Emerging | Rate of Weevil Emergence |
|---|---|---|
| Example 77 | 0 | 0% |
| Control group | 1,500 | 100% |

Example 78

After 10 bean jam-filled buns weighing 15 g each and the oxygen absorbent package of Example 76 were put in a bag laminated with polyvinylidene chloride-coated stretched nylon and polyethylene, the bag was sealed to have an air amount in the bag of 1,000 ml and stored at 20° C. One week after, the oxygen concentration in the bag and the concentration of carbon dioxide gas were measured and the property of the buns was observed.

For a control group, the same test was performed as described above except that the oxygen absorbent package was not enclosed in the bag.

The results are shown in Table 18.

TABLE 18

|  | Concentration of Oxygen (%) | Concentration of Carbon Dioxide (%) | Property of Bean Jam-Filled Buns |
|---|---|---|---|
| Example 78 | 0.01 | 0 | No-abnormality was noted. |
| Control group | 16.5 | 3.7 | Mildew generated. |

The oxygen absorbent of the present invention is free of iron powders. Therefore, even if the oxygen absorbent is applied to a metal detector after the oxygen absorbent is sealed together with food, the oxygen absorbent is not detected with the metal detector so that inspection may determine whether food is contaminated with foreign matters. In addition, the oxygen absorbent is mainly composed of the 1,2-glycol, glycerine or sugar alcohol and is thus highly safe in view of the components. Furthermore, no noxious gas is generated during the reaction.

The oxygen absorbent of the present invention is also applicable to substances to be preserved over a wide range of conditions which are adversely affected by the presence of oxygen, for example, for preservation, antimolding, prevention from contamination with microorganisms such as bacteria, etc., mothproofing, antioxidation, antifading, rust prevention, etc., of drugs, clothes, furs, medical apparatus and equipments, precision apparatus, equipment and parts, electron apparatus and equipment, electron materials and parts, antiques, etc.

What is claimed is:

1. An oxygen absorbent which is free of elemental metal comprising: (a) a 1,2-glycol; and (b) at least 10 parts of at least one alkaline substance and at least 1 part of at least one phenolic compound or quinone compound, each based on 100 parts of said 1,2-glycol.

2. An oxygen absorbent which is free of elemental metal according to claim 1, wherein said 1,2-glycol is ethylene glycol.

3. An oxygen absorbent which is free of elemental metal according to claim 1, wherein said 1,2-glycol is propylene glycol.

4. An oxygen absorbent which is free of elemental metal according to claim 1, wherein said alkylene substance is a hydroxide, carbonate, hydrogencarbonate, tertiary phosphate or secondary phosphate of an alkali metal or alkaline earth metal.

5. An oxygen absorbent which is free of elemental metal according to claim 1, which comprises a 1,2-glycol, an alkaline substance and a phenolic compound.

6. An oxygen absorbent which is free of elemental metal according to claim 1, further including water.

7. An oxygen absorbent which is free of elemental metal according to claim 1, further including a transition metal compound.

8. An oxygen absorbent which is free of elemental metal according to claim 1, further including a solid which is sparingly soluble in water.

9. An oxygen absorbent which is free of elemental metal according to claim 1, wherein said quinone compound is benzoquinone or diphenoquinone.

10. An oxygen absorbent which is free of elemental metal according to claim 1, wherein said phenolic compound is a monovalent phenolic compound.

11. An oxygen absorbent which is free of elemental metal according to claim 1, wherein said phenolic compound is a polyvalent phenolic compound.

12. An oxygen absorbent which is free of elemental metal comprising: (a) glycerine; and (b) at least 1 part of at least one phenolic compound or quinone compound and at least 10 parts of at least one alkaline substance, each based on 100 parts of glycerine.

13. An oxygen absorbent which is free of elemental metal according to claim 12, wherein said alkaline substance is a hydroxide, carbonate, hydrogencarbonate, tertiary phosphate or secondary phosphate of an alkali metal or alkaline earth metal.

14. An oxygen absorbent which is free of elemental metal according to claim 12, further including water.

15. An oxygen absorbent which is free of elemental metal according to claim 12, further including a transition metal compound.

16. An oxygen absorbent which is free of elemental metal according to claim 12, further including a solid which is sparingly soluble in water.

17. An oxygen absorbent which is free of elemental metal according to claim 12, wherein said phenolic or quinone compound is a phenolic compound.

18. An oxygen absorbent which is free of elemental metal according to claim 12 wherein said quinone compound is a benzoquinone or diphenoquinone.

19. An oxygen absorbent which is free of elemental metal according to claim 17, wherein said phenolic compound is a monovalent phenolic compound.

20. An oxygen absorbent which is free of elemental metal according to claim 17, wherein said phenolic compound is a polyvalent phenolic compound.

21. An oxygen absorbent which is free of elemental metal comprising: (a) at least one sugar alcohol; and (b) at least 1 part of at least one phenolic compound or quinone compound and at least 10 parts of at least one alkaline substance, each based on 100 parts of said sugar alcohol.

22. An oxygen absorbent according to claim 21, wherein said alkaline substance is a hydroxide, carbonate, hydrogen carbonate, tertiary phosphate or secondary phosphate of an alkali metal or alkaline earth metal.

23. An oxygen absorbent which is free of elemental metal according to claim 21, further including water.

24. An oxygen absorbent which is free of elemental metal according to claim 21, further including a transition metal compound.

25. An oxygen absorbent which is free of elemental metal according to claim 21, further including a solid which is sparingly soluble in water.

26. An oxygen absorbent which is free of elemental metal according to claim 21, wherein said phenolic or quinone compound is a phenolic compound.

27. An oxygen absorbent which is free of elemental metal according to claim 21 wherein the sugar alcohol is erythritol, xylitol or sorbitol.

28. An oxygen absorbent which is free of elemental metal according to claim 21 wherein the sugar alcohol is xylitol.

29. An oxygen absorbent which is free of elemental metal according to claim 21 wherein the sugar alcohol is sorbitol.

30. An oxygen absorbent which is free of elemental metal according to claim 21 wherein said quinone compound is benzoquinone or diphenoquinone.

31. An oxygen absorbent which is free of elemental metal according to claim 26, wherein said phenolic compound is a monovalent phenolic compound.

32. An oxygen absorbent which is free of elemental metal according to claim 26, wherein said phenolic compound is a polyvalent phenolic compound.

33. An oxygen absorbent which is free of elemental metal comprising: (a) an oxygen absorbent component consisting essentially of at least one of 1,2-glycols, glycerine and sugar alcohols; and (b) at least 10 parts of at least one alkaline hydroxide and at least 1 part of at least one transition metal compound, each based on 100 parts of said oxygen absorbent component.

34. An oxygen absorbent which is free of elemental metal according to claim 33 further including from 1 part to 1000 parts, based on 100 parts of said oxygen absorbent component, of a solid substance which is sparingly soluble in water.

35. An oxygen absorbent which is free of elemental metal according to claim 33 further including up to 100 parts, based on 100 parts of said oxygen absorbent component, of water.

36. An oxygen absorbent which is free of elemental metal according to claim 33 wherein said alkaline hydroxide is calcium hydroxide.

37. An oxygen absorbent which is free of elemental metal according to claim 33 wherein said transition metal compound comprises a salt of iron, copper, manganese or nickel.

38. An oxygen absorbent which is free of elemental metal according to claim 33 further comprising from 1 part to 35 parts of at least one compound selected from the group consisting of polyvalent phenolic compounds and quinone compounds, based on 100 parts of said oxygen absorbent component.

39. An oxygen absorbent which is free of elemental metal according to claim 33 wherein said 1,2-glycol is ethyleneglycol or propyleneglycol.

40. An oxygen absorbent which is free of elemental metal according to claim 33 wherein said sugar alcohol is erythritol, xylitol or sorbitol.

41. An oxygen absorbent which is free of elemental metal according to claim 38 wherein said polyvalent phenolic compound is catechol or gallic acid.

42. An oxygen absorbent which is free of elemental metal according to claim 38 wherein said quinone compound is benzoquinone or diphenoquinone.

* * * * *

UNITED STATES PATENT AND TRADEMARK OFFICE
CERTIFICATE OF CORRECTION

PATENT NO. : 5,180,518

DATED : January 19, 1993

INVENTOR(S) : Sugihara et al.

It is certified that error appears in the above-identified patent and that said Letters Patent is hereby corrected as shown below:

On the Title page,

Item no. [57], Abstract, line 3, change "with the oxygen absorbent materials" to --and a phenolic or quinone compound--.

Claim 18, col. 20, line 5, after "12" insert --,--.

Signed and Sealed this

Ninth Day of November, 1993

*Attest:*

BRUCE LEHMAN

*Attesting Officer*  *Commissioner of Patents and Trademarks*